US006307338B1

United States Patent
Kuner et al.

(12) United States Patent
(10) Patent No.: US 6,307,338 B1
(45) Date of Patent: Oct. 23, 2001

(54) ELECTRONICALLY COMMUTATED MOTOR

(75) Inventors: Arnold Kuner; Frank Jeske, both of St. Georgen; Irmgard Moosmann, Königsfeld; Michael Moosmann, Königsfeld; Christian Moosmann, Königsfeld, all of (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/673,040

(22) PCT Filed: Feb. 26, 1999

(86) PCT No.: PCT/EP99/01265

§ 371 Date: Dec. 12, 2000

§ 102(e) Date: Dec. 12, 2000

(87) PCT Pub. No.: WO99/60694

PCT Pub. Date: Nov. 25, 1999

(30) Foreign Application Priority Data

May 19, 1998 (DE) .......................................... 298 09 025 U

(51) Int. Cl.[7] ....................................................... H02P 3/08
(52) U.S. Cl. .......................... 318/254; 318/439; 318/138
(58) Field of Search .................................. 318/254, 138, 318/439

(56) References Cited

U.S. PATENT DOCUMENTS

| 4,356,437 | * | 10/1982 | Saito et al. | 318/254 |
| 4,542,323 | | 9/1985 | Doemen | 318/254 |
| 4,626,751 | | 12/1986 | Doemen | 318/254 |
| 4,734,627 | | 3/1988 | Koerner | 318/254 |
| 4,748,386 | * | 5/1988 | Nakanishi et al. | 318/254 |
| 5,349,275 | * | 9/1994 | Muller | 318/254 |
| 5,563,480 | * | 10/1996 | Okada | 318/254 |
| 5,731,674 | * | 3/1998 | Jeske | 318/439 |

FOREIGN PATENT DOCUMENTS

| 23 46 380 | 11/1974 | (DE) . |
| 28 22 315 C2 | 12/1979 | (DE) . |
| 33 48 986 A1 | 6/1985 | (DE) . |
| 36 28 306 | 2/1988 | (DE) . |
| 0 722 214 A1 | 7/1996 | (EP) . |

OTHER PUBLICATIONS

Zetex Corp. datasheet: ZTX600 NPN Silicon Planar Medium Power Darlington Transistors, Jun. 1994.
Philips datasheet: BC846; BC847 NPN general purpose transistors, Apr. 23, 1999, 8 pp.
Rohm Co. Ltd. datasheet: 2–phase half–wave motor pre-driver BA6406F, pp. 696–699, Aug. 2000.
WPI English abstract of Müller/Papst DE 36 28 306, publ. Feb. 25, 1988.
WPI English abstract of Papst FR 2,244,290 publ. May 16, 1975 & DE 23 46 380 filed Sep. 14, 1973.

* cited by examiner

Primary Examiner—Robert E. Nappi
Assistant Examiner—Rita Leykin
(74) Attorney, Agent, or Firm—Milton Oliver; Ware, Fressola Van Der Sluys & Adolphson LLP

(57) ABSTRACT

An electronically commutated motor has at least two winding phases (112, 114) which are wound together or otherwise inductively coupled. Current in each phase is controlled by a respective power transistor (124, 128). An integrated circuit controller (146) receives signals from a Hall sensor (118) and generates rotor position output signals (OUT1, OUT2) which are oppositely phased and are applied to the bases of the respective power transistors (124, 128) so that the power transistors never both conduct at the same time. Further, a pair of latching transistors (162, 172) and a pair of base drain resistors (164, 174), connected to respective bases of the power transistors (124, 128) are provided, in order to assure "soft" switching of the power transistors at low RPM, yet prompter switching and higher efficiency at high RPM. These additional components also ensure a sufficiently long current gap between switch-off of one power transistor and switch-on of the other power transistor.

17 Claims, 6 Drawing Sheets

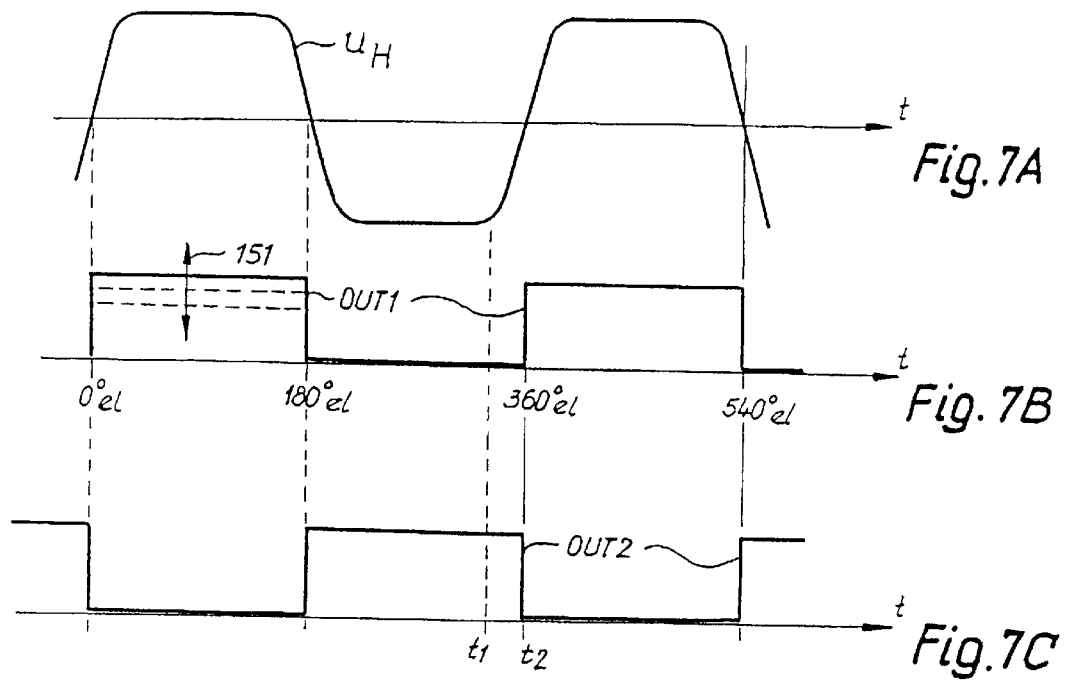
Fig. 7A
Fig. 7B
Fig. 7C
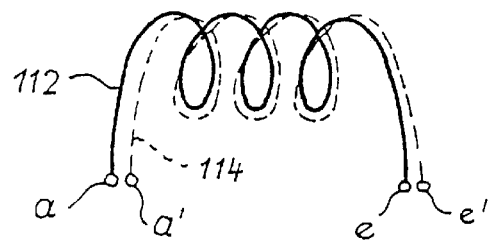
Fig. 8 a resistor 50 (e.g. 8.2 kΩ) to the base of transistor 24, which is connected via a capacitor 52 (e.g. 1 Nf) to the collector

ELECTRONICALLY COMMUTATED MOTOR

FIELD OF THE INVENTION

The invention relates to an electronically commutated motor having at least two stator winding strands or phases, each of which can be actuated by means of an associated power transistor. Such motors are often referred to as "two-phase" motors and are used in great quantities, above all in fans. FIG. 6 shows one of the circuits presently used by the Applicant for controlling such motors.

BACKGROUND

Often, such motors must be capable of being operated on very differing voltages, e.g. a fan with a nominal voltage of 24 V is, in practice, operated with voltages ranging between 12 V and 32 V, which represents a voltage deviation range from −50% to +30%. Depending upon voltage, such a fan runs at a desired speed (RPM), i.e. slowly at lower voltages, and fast at higher voltages.

Upon commutation of the motor current from one stator winding phase to another, the switchover can occur in a "hard" or in a "soft" manner. A hard switchover offers good efficiency, but high structure-borne noise levels caused by commutation noise and, additionally, EMC problems (EMC=Electro-Magnetic Compatibility). Further, protective measures must be taken for the end-stage transistors, so that the critical limit values of the components (permissible collector voltages etc.) are not exceeded. This can be accomplished by internal Z-diodes contained in the end-stage transistors or by external Z-diodes (for limiting these voltages) or by recovery diodes which feed back the shutoff energy of the windings to an operating voltage link circuit containing a capacitor capable of receiving this shutoff energy.

FIG. 6 shows a motor 10 with two stator winding strands or phases 12, 14 and a (schematically indicated) permanent magnet rotor 16, in whose vicinity a Hall generator 18 is located. Hall generator 18 is also shown in the left portion of FIG. 6. Ohmic resistors of phases 12 and 14 are designated 20 and 22, respectively. Phase 12 is connected in series with an npn Darlington transistor 24 with built-in recovery diode 26, and phase 14 is connected in series with an npn Darlington transistor 28 with built-in recovery diode 30. The emitters of transistors 24, 28 are connected via a common emitter resistor 32 to a negative conductor 34. Phases 12, 14 are connected to a positive conductor 36, as shown. Conductors 34, 36 are, during operation, connected to a power supply device 38 which contains a storage capacitor 40. This serves to take up the shutoff energy of phases 12, 14, which is fed back via recovery diodes 26, 30 into this capacitor 40. To the extent that the motor is supplied from an accumulator, the shutoff energy is fed back into the accumulator.

Hall generator 18 is connected via a resistor 42 with positive conductor 36 and via a resistor 44 with negative conductor 34. Its output signal UH (FIG. 7A) is applied to both inputs IN1 and IN2 of an IC (Integrated Circuit) 46 which generates signals OUT1 and OUT2 for controlling transistors 24, 26 and simultaneously serves as blocking or stall protection for motor 10, i.e. when it is unable to turn, it is switched off by IC 46.

This IC is preferably the ROHM BA6406. FIG. 7A shows the signal UH, FIG. 7B shows the signal OUT1 of IC 46 and FIG. 7C shows the signal OUT2. Signals OUT1 and OUT2 run in phase opposition to each other. FIG. OUT1 is fed via a resistor 50 (e.g. 8.2 kΩ) to the base of transistor 24, which is connected via a capacitor 52 (e.g. 1 Nf) to the collector and via a base drain-off resistor 54 (e.g. 1.2 kΩ) to negative conductor 34. In the same manner, signal OUT2 is fed via a resistor 56 to the base of transistor 28, which is connected via a capacitor 58 with its collector and via a base drain-off resistor 60 with negative conductor 34.

During operation, transistors 24, 28 are alternately switched on by signals OUT1, OUT2. Through the combination of resistor 50 and capacitor 52 and the common resistor 32, a soft switching of transistor 24 is achieved. Similarly, resistor 56, in combination with capacitor 58 and common resistor 32, effects a soft switching of transistor 28. However, these measures cause an increased warming of transistors 24, 28 and therefore a reduction in efficiency. Furthermore, the circuit can be optimally configured only for a single operating point, i.e. for a specified RPM and a specified torque. This results in many compromises, especially with respect to voltage overruns and temperature overruns. One also obtains, in practice, a voltage range only of ±15%.

SUMMARY OF THE INVENTION

It is therefore an object of the invention to provide a new electronically commutated motor.

In accordance with the invention, this object is achieved by adding latching circuitry, including two transistors, to prevent simultaneous conduction of both power transistors. By the alternate biasing of the power transistors, one achieves that such a motor is usable over a large range of its operating voltage $U_B$; and further, that, during commutation, both power transistors are briefly blocked, which minimizes braking torques and improves efficiency, and that the kind of commutation can be adapted to the rotation speed (soft commutation at low RPM, hard commutation at higher RPM). This can be achieved by making the kind of ascent and descent of the commutation signal dependent upon the RPM. Such a solution is also very economical.

BRIEF FIGURE DESCRIPTION

Further details and advantageous features of the invention will be apparent from the embodiment described below and illustrated in the drawings, which is not to be understood as limiting the invention, as well as from the dependent claims. Shown are:

FIG. 7 is a signal diagram illustrating the operation of the motors shown in FIGS. 1 and 6;

FIG. 8 is a schematic diagram illustrating a first embodiment of the stator winding.

DETAILED DESCRIPTION

Figure 1:
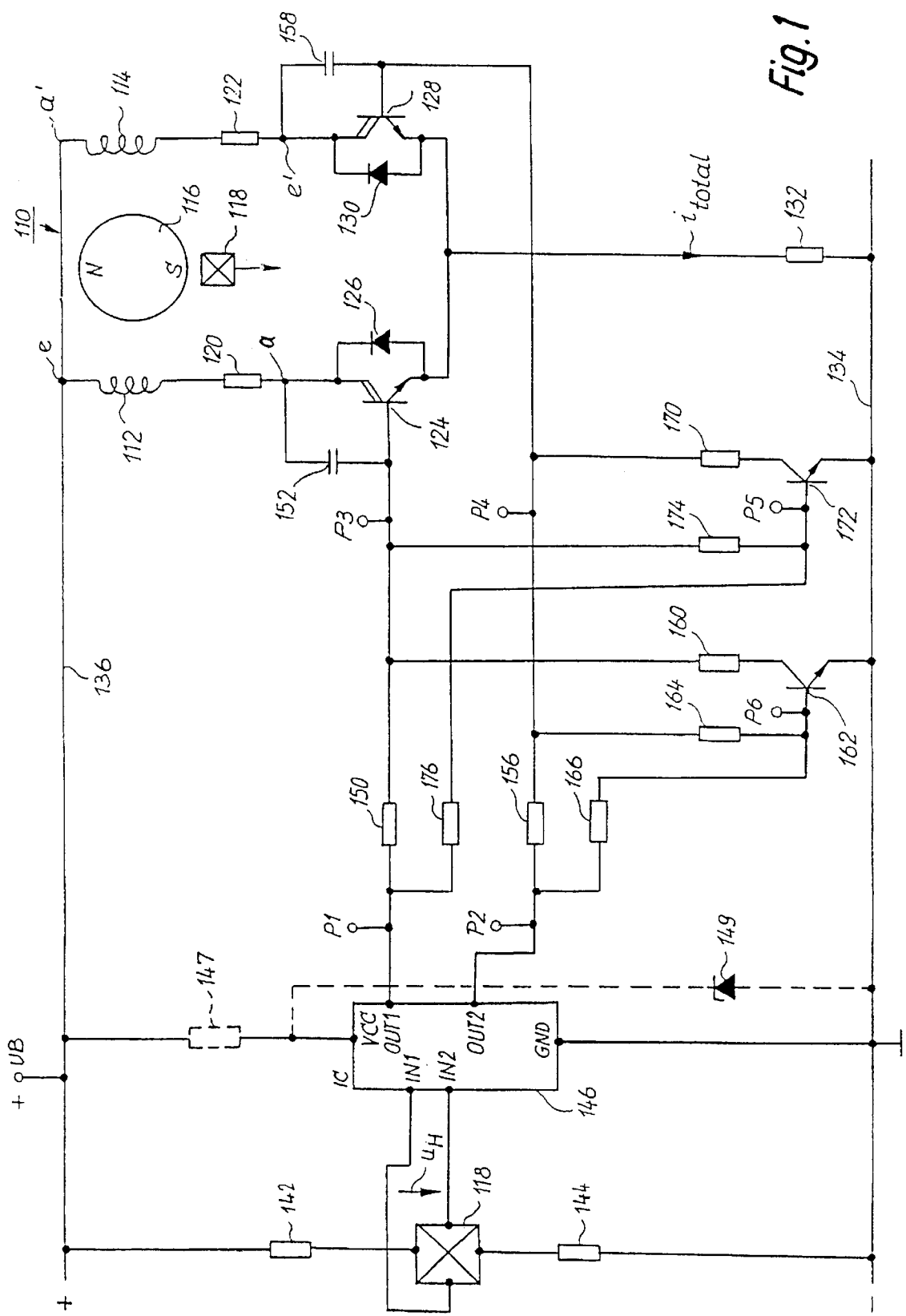
FIG. 1 illustrates a preferred embodiment of an electronically commutated motor according to the invention.

The electronically commutated motor 110 according to FIG. 1 has two stator winding phases 112, 114 and a (schematically illustrated) permanent magnet rotor 116, in whose vicinity a Hall generator 118 is located, as also shown on the left side of FIG. 1. Respective ohmic resistances of the windings 112 and 114 are designated 120 and 122.

Figure 9:
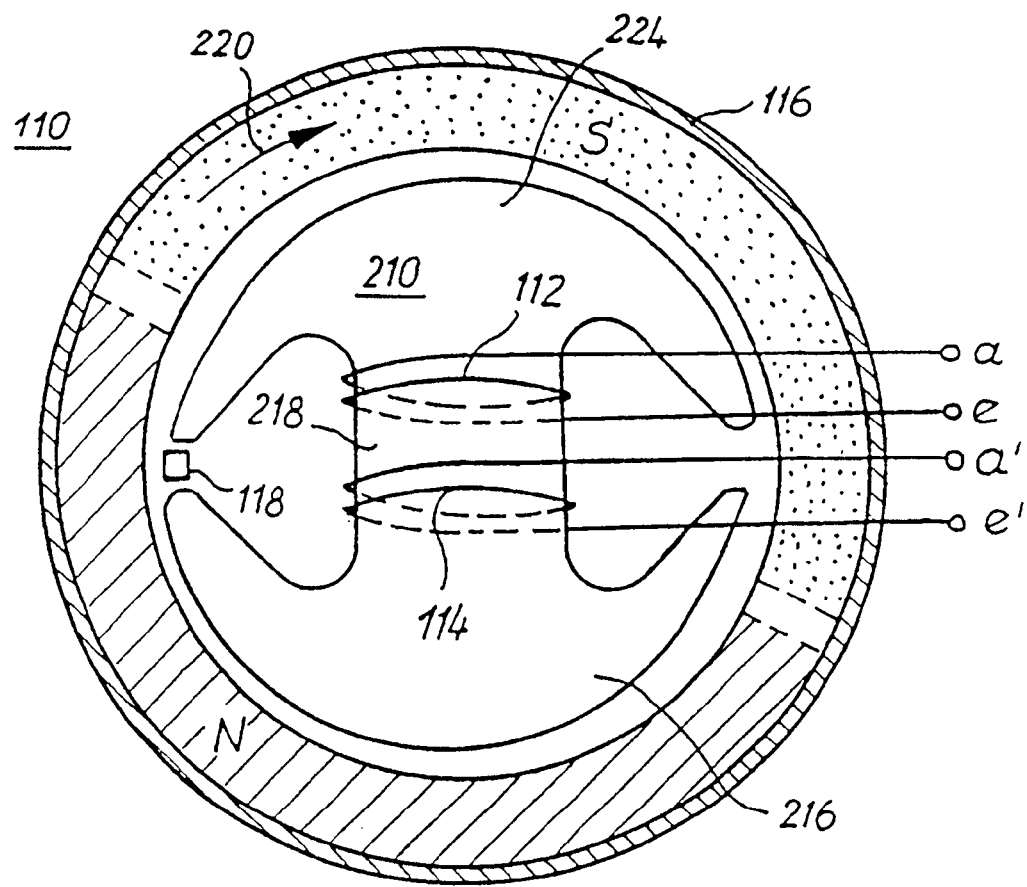
FIG. 9 is a schematic diagram illustrating a second embodiment of the stator winding.

As shown in FIG. 8, by way of example, the two phases 112, 114 are preferably coupled with each other by making the winding with two parallel wires, i.e. as a so-called "bifilar" winding. The terminals of phase 112 are designated a and e, and the terminals of phase 114 are designated a' and b' as shown in FIGS. 8 and 9. In phase 112, current flows from a to e, while in phase 114, current flows from e' to a', so that these two phases create opposing magnetic fluxes. Motor 110 can, for example, be constructed as shown in DE 23 46 380 filed Sep. 14 1973, assigned Papst Motoren KG.

Alternatively, phases 112, 114 may be inductively coupled together via the metal lamination stack of the stator. FIG. 9 shows this, on a two-pole stator 210 of an external rotor motor. Phase 112 is wound on the upper stator pole 214, and phase 114 is wound on the lower stator pole 216. Part 218 of the lamination stack between poles 214, 216 effects a close magnetic coupling of the winding phases 112, 114. The preferred rotation direction of the motor of FIG. 9 is designated 220. In FIG. 9, the internal stator 210 remains still, and the two-pole rotor 116 rotates around it.

Phase 112 is, as shown in FIG. 1, in series with an npn Darlington transistor 124 with built-in recovery or free-running diode 126, and phase 114 is in series with an npn Darlington transistor 128 with built-in recovery or free-running diode 130. The emitters of transistors 124, 128 are, in the illustrated embodiment, connected in an advantageous manner via a common emitter resistor 132 to a negative conductor 134. optionally, each of transistors 124, 128 can have its own emitter resistor. Phases 112, 114 are, as shown, connected to a positive conductor 136. Conductors 134, 136 are, during operation, usually connected to a power supply 38 (FIG. 6) which includes a storage capacitor 40. It serves the purpose of absorbing the shut-off energy of stator phases 112, 114, which is fed back via recovery diodes 126, 130 into this capacitor 40.

Depending upon how "softly" the end-stage transistors 124, 128 are switched during commutation, there is a reduction in the shut-off energy, which must be fed back into capacitor 40 during the commutation. In the most favorable scenario, such a capacitor becomes unnecessary, since a slow shut-off of transistors 124, 128 means that this energy can be completely converted into heat in the end stages.

Hall generator 118 is connected via a resistor 142 to the positive conductor 136 and via a resistor 144 to the negative conductor 134. The generator output signal UH (FIG. 7A) is applied to both inputs IN1 and IN2 of an IC 146, which generates the signals OUT1 and OUT2 for control of transistors 124, 128 and which simultaneously provides protection against stalling of motor 110; that is, when rotor 116 cannot turn, the motor is turned off by IC 146. FIG. 7A shows this signal UH, FIG. 7B shows signal OUT1 of IC 146, and FIG. 7C shows signal OUT2. The two last-mentioned signals are phased oppositely to each other. Signal OUT1 is fed via a resistor 150 to the base of transistor 124, which is connected via a capacitor 152 (Miller capacitor) to the collector of transistor 124. In the same manner, signal OUT2 is fed via a resistor 156 to the base of transistor 128, which is connected via a capacitor 158 (Miller capacitor) to its collector.

IC 146 is, as shown, connected via its terminal VCC to the positive conductor 136 and via its terminal GND to the ground or negative conductor 134. Optionally, a resistor 147 can be placed in the connection to positive conductor 136, and terminal VCC can be connected via a Z-diode 149 to negative conductor 134. The Zener voltage of diode 149 can be selected to be above the nominal operating voltage $U_B$, e.g. 28 V if the motor is designed for 24 V. Thereby, the amplitudes of signals OUT1, OUT2 rise to a voltage of 28 V and then remain constant, even if $U_B$ rises still higher. In FIG. 7B, the variable amplitude of signal OUT1 is indicated by the double-ended arrow 151. The same applies for the signal OUT2, but this is not shown.

Thus, below the Zener voltage, one has a dependence of signal amplitudes upon $U_B$, but not above the Zener voltage. Without the Z-diode 149, there is this dependence over the entire range of $U_B$.

The base of transistor 124 is connected via a base drain resistor 160 and the collector-emitter path of an npn transistor 162 to the negative conductor 134. The base of transistor 162 is connected via a resistor 164 to the base of transistor 128 and via a resistor 166 to the output OUT2 of IC 146. The value ratio of resistor 164 to resistor 166 is about, for example, 3:100, i.e. the influence of the signal on the base of transistor 124 is stronger than that of signal OUT2.

In a fully symmetrical manner, the base of transistor 128 is connected via a base drain resistor 170 and via the collector-emitter path of an npn transistor 172 to the negative conductor 134. The base of transistor 172 is connected via a resistor 174 to the base of transistor 124, and via a resistor 176 to the output OUT1 of IC 146. The values of resistors 174, 176 correspond to those of resistors 164, 166.

The transistors 162, 172 can, on the one hand, be called "safety or latching" transistors, since they latch the two power transistors 124, 128 with respect to each other, and prevent them from both being conductive (ON) at the same time. On the other hand, these transistors do not simply switch ON or OFF; rather, they activate, during the commutation interval, the base drain resistors 160 and 170, respectively, while in the time ranges outside the commutation, these resistors 160, 170 are not active.

Figure 6:
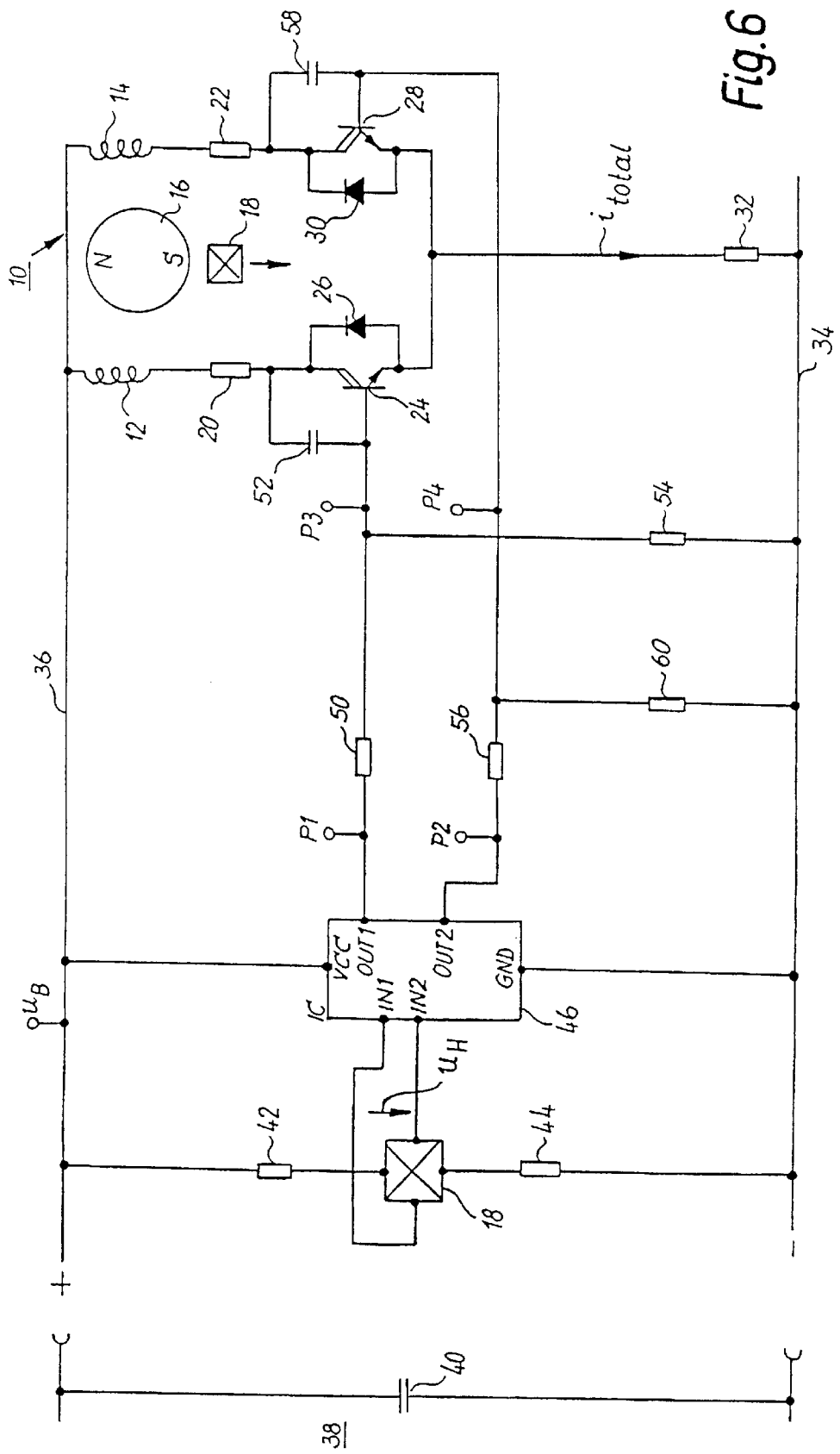
FIG. 6 is a schematic diagram of a motor according to the prior art.

According to the prior art circuit shown in FIG. 6, the base drain resistors 54, 60 are continuously active. This is particularly disadvantageous during an undervoltage condition, since, for example, in FIG. 6 the resistor 60 and resistor 56 together form a voltage divider which, if there is a low operating voltage $U_B$, may prevent transistor 28 from receiving an adequate base current.

However, since in the circuit according to FIG. 1, the base drain resistors 160, 170 are only active in the interval of the commutation process, and not active in the time interval between two commutations, problems in the latter time interval arising from resistors 160, 170 are avoided, even in case of low operating voltage $U_B$, since they are not then active, as already described.

In the circuit, various monitoring points P1 to P6 are as shown. If, for example, power transistor 124 is conductive, monitoring points P1 and P3 have differing potentials, since a base current flows via resistor 150 from the positive (high) output OUT1 to the base of transistor 124, and upon shut-off of transistor 124, the signal OUT1 is indeed low, but the shut-off voltage of winding 112 is transmitted via capacitor 152 to the base of transistor 124, and has the effect that this base receives base current for a little while longer. Due to the symmetry of the circuit, the relationships at transistor 128 are identical.

PREFERRED VALUES OF COMPONENTS

Motor 110 is, in this example, designed for an operating voltage of 24 V direct current, and has a power draw of 2.4 W at this nominal voltage.

| Hall generator 118 | HWA 101 |
|---|---|
| IC 146 | ROHM BA6406 |
| Resistor 132 | 1 Ω |
| Resistors 150, 156 | 8.2 kΩ |
| Resistors 160, 170 | 560 Ω |
| Resistors 164, 174 | 1.5 kΩ |
| Resistors 166, 176 | 47 kΩ |
| Capacitors 152, 158 | 3.3 nF |
| Transistors 124, 128 | ZTX600 |
| Transistors 162, 172 | BC847A |

MODE OF OPERATION

Since the arrangement is symmetrical, it suffices to describe the processes involved in the switching of current from phase 114 to phase 112, since the processes in the reverse direction, ie. from phase 112 to phase 114, take the same course.

Whenever phase 114 is carrying current, the signal OUT1 is low and the signal OUT2 is high. This corresponds to instant t, in FIG. 7. Thus, transistor 124 is blocked, and transistor 128 is conducting, as is transistor 162, since its base is subjected to the high signal OUT2. However, since OUT1 is low, no current flows over its collector-emitter path, i.e. in this state, transistor 162 has no influence on the function of the motor and also does not influence its efficiency.

Upon commutation at instant $t_2$ (FIG. 7), signal OUT1 goes high and signal OUT2 goes low. Transistor 162 continues to conduct, since it receives, as before, a base current from the base of transistor 128, and thereby transistor 124 remains initially blocked, although signal OUT1 is high, since its base current is drained away via resistor 160. Transistor 128, in this state, is still conductive, since it is still receiving a base current, via capacitor 158.

At monitoring point P3, one obtains a potential which is determined by the resistors 150, 160 and the capacitor 152. Point P1 is, as previously described (arrow 151 in FIG. 7B), at a potential which is dependent upon the potential of positive conductor 136. The potential at point P3, due to capacitor 152, is delayed in reaching its end value, which is determined by resistors 150, 160. At this time, transistor 172 is still not conducting. The potential on the base of transistor 172 is determined by the signal OUT1, which in this case is high, and by the voltage divider 176, 174, connected to the base of transistor 174, which at this instant still has a low potential. Thus, transistor 172 remains temporarily blocked.

Due to the increase in charge on capacitor 152, the potential at P3 rises, so that transistor 172 begins to conduct, which assures blocking of transistor 128. Upon blocking of transistor 128, the time constant of elements 158 (capacitor) and 170 (resistor) becomes effective. The current amplification of transistors 162, 172 has little influence on the time delay. As soon as transistor 172 becomes conductive, this removes the base current from transistor 162, which hitherto had been supplied via resistor 164. Thereby the current over the base drain resistor 160 stops, and transistor 124 is released and can turn on according to a time constant which is determined by the resistor 150 and the capacitor 152. Transistor 128 is, at this instant, currentless, i.e. between the shut-off of transistor 128 and the turn-on of transistor 124 124, a current gap is created, in which neither transistor 124 nor transistor 128 is conductive.

These processes are supported by the inductive coupling between phases 112 and 114, examples of which are shown in FIGS. 8 and 9.

Figure 2:
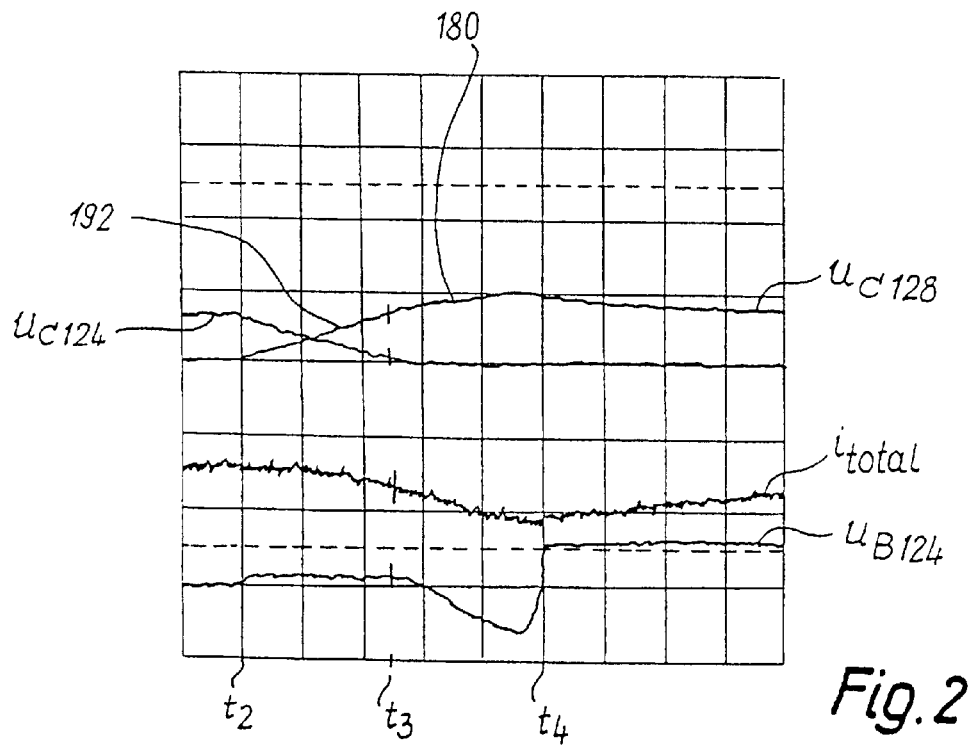
FIG. 2 is a graph showing the course of commutation during operation at a 50% undervoltage (12 V), the normal operating voltage being 24 V in this example.

FIG. 2 illustrates the voltage courses at a low voltage $U_B$ of 12 V. The curves $U_{C128}$, $U_{C124}$ show the collector voltages of transistors 128, 124, respectively.

At instant $t_2$, signals OUT1 and OUT2 change. During a transition phase until instant $t_3$ voltage $U_{C124}$ decreases and voltage $U_{C128}$ increases, because transistor 128 starts to block. Due to the inductive coupling (FIG. 8) of windings 112, 114, the increase in $U_{C128}$ between $t_2$ and $t_3$ corresponds essentially to the decrease in $U_{C124}$, without transistor 124 being conductive yet. In the interval from $t_3$ to $t_4$ the shut-off voltage of phase 114 causes a rise 180 in $U_{C128}$ and thus a recovery current through diode 130. This keeps transistor 162 conductive, so that a portion of the base current of transistor 124 flows via resistor 160, and transistor 124 can first switch on at instant $t_4$, at which time its base voltage $U_{B124}$ has become sufficiently positive because transistor 162 has blocked.

Transistor 128 is thus switched off at instant $t_3$, and transistor 124 is first switched on at $t_4$, thereby producing, between $t_3$ and $t_4$, a current gap. The shut-off and turn-on processes run gently, so that the motor produces little structure-borne noise during the commutation. This is important in a fan, because at low RPM the fan noises should be minimized.

Figure 3:
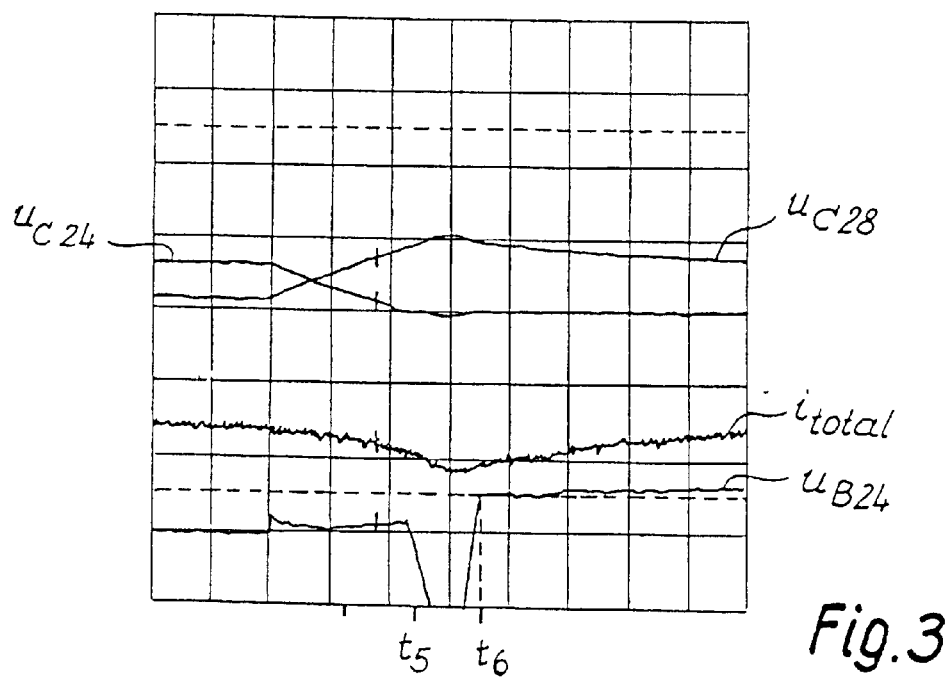
FIG. 3 is a graph, analogous to FIG. 2, for the prior art motor shown in FIG. 6.

FIG. 3 shows the analogous processes in the motor according to FIG. 6, also at a low voltage of 12 V. There, transistor 28 shuts off about at instant $t_5$, and at instant $t_6$, transistor 24 is turned on, i.e. the current gap is shorter here. Furthermore, as previously mentioned, the resistors 54 and 60 are continuously active, which is unfavorable for the operation of the motor at low voltages.

Figure 4:
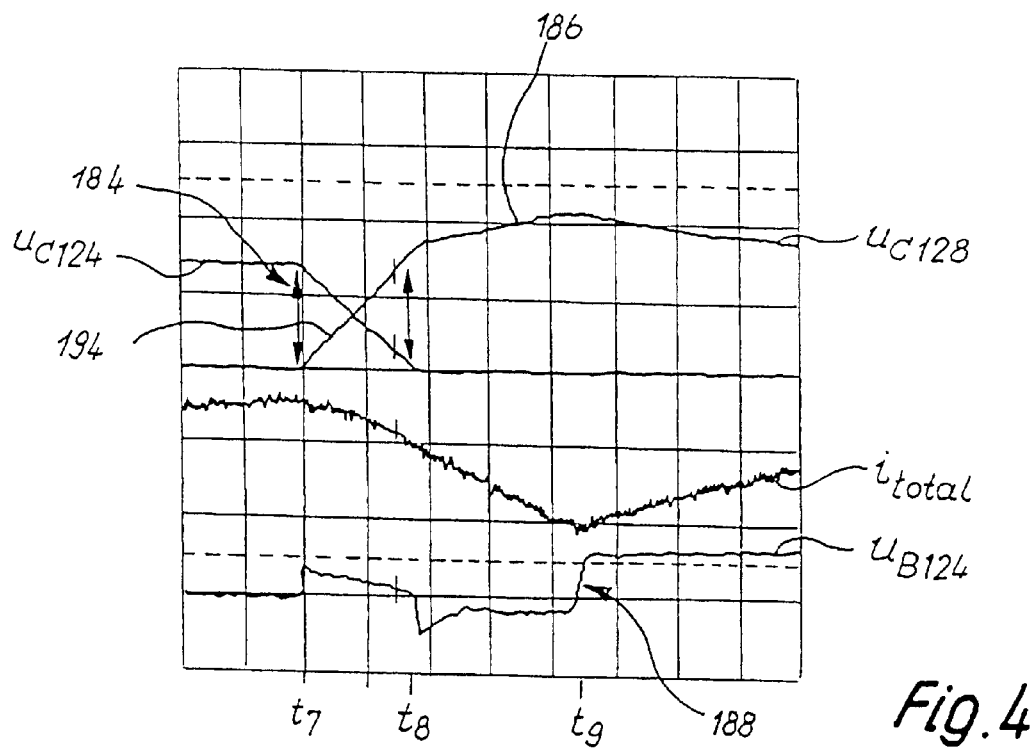
FIG. 4 is a graph showing the course of commutation, in a motor according to FIG. 1, during operation at a 16.5% overvoltage ,(28 V)

FIG. 4 shows the processes in the motor of FIG. 1, when it is operated at an overvoltage of 28 V. Rotor 16 here rotates significantly faster, i.e. the processes of commutation must be executed faster, so that the power of the motor will be sufficiently large and that it can achieve a high rotation speed.

At instant $t_7$, the signals OUT1, OUT2 change, which means, due to the inductive coupling of phases 112, 114, that the voltage $U_{C124}$ on the collector of transistor 124 decreases and the voltage $U_{C128}$ of transistor 128 increases until instant $t_8$, in such a way that the decrease and the increase correspond. This inductive (transformer) coupling of the windings (cf. FIG. 8) is indicated by an arrow 184.

Subsequently, the shut-off current spike on winding 114 causes (at 186) an increase in voltage $U_{C128}$, which lengthens the current gap further up to an instant $t_9$, at which, due to the blocking of transistor 162, the base voltage $U_{B124}$ rises so far that this transistor becomes conductive. The increase of $U_{B124}$ is designated 188. Thus, at high voltages and high RPM, the current gap lasts from $t_8$ to $t_9$.

Upon comparison of FIGS. 2 and 4, it is significant that the steepness 192 of the rise of collector voltage $U_{C128}$ in FIG. 2 is low, and this steepness 194 in FIG. 4 is high. This is a result of the fact that the amplitudes of signals OUT1, OUT2, in the high state, are approximately proportional to the operating voltage $U_B$, so that the charging of capacitor 152 (or 158) and the switching of transistor 172 (or 162) occurs faster at high $U_B$. This is a result of the voltage divider 166, 164 between points P2 and P4 and the voltage divider 176, 174 between points P1 and P3. Due to the higher input voltage at P1 or P2, at points P5 or P6 the necessary turn-on voltage is achieved sooner, if the voltage $U_B$ is higher.

Figure 5:
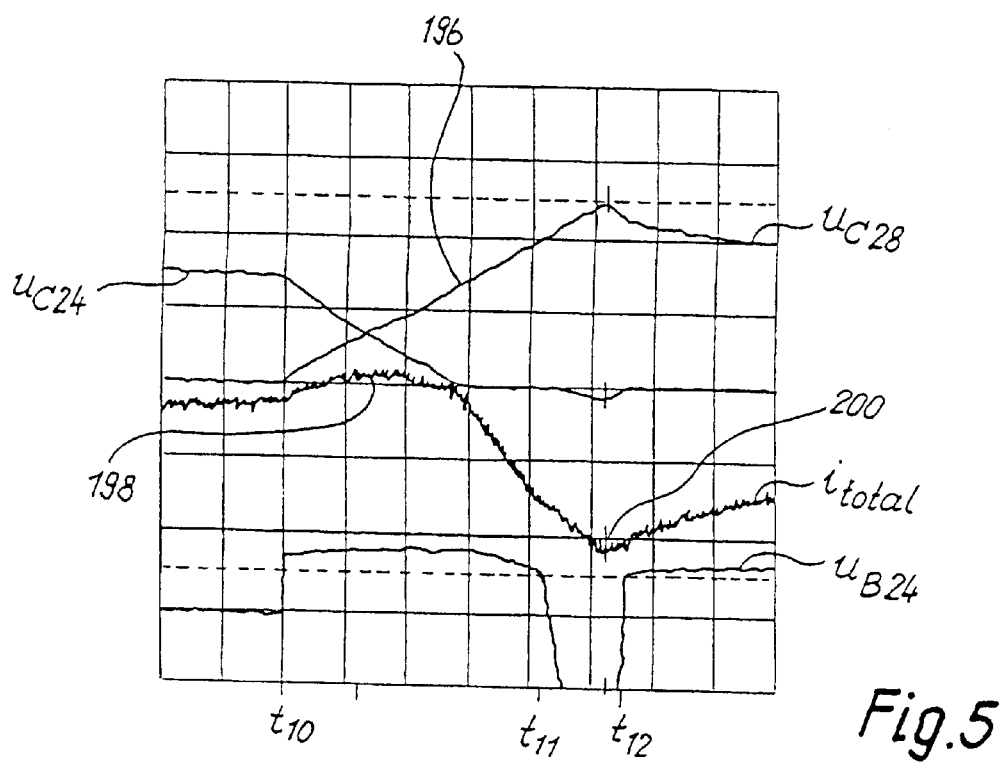
FIG. 5 is a graph, analogous to FIG. 4, for the prior art motor shown in FIG. 6.

FIG. 5 shows that, in the motor of FIG. 6, the steepness 196 of the increase in $U_{C28}$ is not much changed from that of FIG. 3 and that, already at instant $t_{10}$, at which the signals OUT2, OUT1 change, the signal $U_{B24}$ goes so high that transistor 24 turns on, so that for a while both transistors 24 and 28 conduct, which leads (at 198) to an increase in total current $i_{total}$.

At instant $t_{11}$, transistor 24 blocks again and at $t_{12}$, it becomes conductive again, which leads (at 200) to a corresponding reduction in the total current $i_{total}$. The shut-off between t11 and $t_{12}$, leads to corresponding heating up of transistor 24 (due to the unnecessary switching processes) and to a reduced efficiency of the motor.

By practicing the invention, one thus achieves, at all rotation speeds, a sufficiently large switching pause during the commutation. At low voltage $U_B$, during the commutation, the current in a winding rises and falls only relatively slowly, i.e. one obtains a switching signal edge with a lower slope, which o results in a quiet running of the motor. At higher operating voltage $U_B$, during the commutation, the current rises and falls in a winding quickly. This improves the efficiency and increases the maximum attainable RPM, at which, however, the structure-borne noise of the motor rises. At high RPM, that is not disturbing, since all the noises are rising anyway. The base drain resistors 160, 170, which are turned on and off by the transistors 162, 172, respectively, are only effective during the commutation, as already described, so that they do not degrade the efficiency of the motor. This permits dimensioning for a large voltage range. The signal at the base of power transistor 124 controls, via the resistor 174, the transistor 172. The signal at the base of power transistor 128 controls, via the resistor 164, the transistor 162. The transistors 162, 172 are so latched with respect to each other that only one of the two can conduct at a given time, and this excludes the possibility that both transistors 124, 128 would conduct at the same time, and a defined current gap is created at commutation, which is a precondition for obtaining a "soft" switching of transistors 124, 128. Comparison of FIGS. 4 and 5 shows this. According to FIG. 5, for a time both transistors 24, 28 conduct simultaneously, whereas by contrast in FIG. 4, a sufficiently long "switching pause" is created.

Naturally, within the scope of the present invention, numerous variations and modifications are possible. In particular, the various functions of latching transistors 162, 172 could be performed by a larger number of transistors, to the extent that the cost thereof is not a factor.

What is claimed is:

1. An electronically commutated motor comprising a stator and a rotor (116),
    at least one rotor position sensing means (118),
    a commutation controller (146), responsive to signals from said rotor position sensing means, for generating rotor position signals (OUT1, OUT2),
    at least first and second power transistors (124, 128),
    at least two stator winding phases (112, 114),
    each adapted to be energized via a respective one of said power transistors (124, 128) and being controllable, as a function of position of the rotor (116), by oppositely phased ones of said rotor position signals (OUT1, OUT2), said signals being applied to the bases of the power transistors via a respective resistor (150, 156),
    a base drain resistor (160) for the base of the first power transistor (124), which resistor (160) is connected in series with a first latching transistor (162),
    a base drain resistor (170) for the base of the second power transistor (128), which resistor (170) is connected in series with a second latching transistor (172),
    the first latching transistor (162) being controllable at least by the base signal of the second power transistor (128) and the second latching transistor (172) being controllable at least by the base signal of the first power transistor (124), in order to prevent, during commutation, simultaneous conduction of both power transistors, and in order to control commutation by activation and deactivation of the base drain resistors (160, 170).

2. The motor according to claim 1, wherein
    the first latching transistor (162) is controllable by a combination of the rotor position signal (OUT2) for the second power transistor (128) and the base signal thereof, and
    the second latching transistor (172) is controllable by a combination of the rotor position signal (OUT1) for the first power transistor (124) and the base signal thereof.

3. The motor according to claim 1, wherein
    both base drain resistors (160, 170) are disabled outside a commutation process time interval.

4. The motor according to claim 1, wherein
    said winding phases which are adapted to be controlled in phase opposition are coupled inductively.

5. The motor according to claim 4, wherein said winding phases are bifilar wound.

6. The motor according to claim 1, wherein
    said first power transistor (124) and said second power transistor (128) have a common emitter resistor (132).

7. The motor according to claim 1, wherein a respective Miller capacitor (152, 158) is associated with each power transistor (124, 128).

8. The motor according to claim 1, wherein the amplitude of a rotor position signal (OUT1, OUT2) increases, at least in a range, as operating voltage ($U_B$) of the motor (110) increases.

9. The motor according to claim 1, further comprising, for generation of the rotor position signals (OUT1, OUT2), a controller (146), whose operating voltage ($U_B$) is, above a predetermined value, held essentially constant, in order, upon overshooting of this predetermined value, to hold constant the amplitudes of the rotor position signals.

10. The motor according to claim 8, wherein
    changes in the collector voltages of the power transistors during commutation occur as a function of the operating voltage ($U_B$).

11. The motor according to claim 2, wherein
    both base drain resistors (160, 170) are disabled outside a commutation process time interval.

12. The motor according to claim 2, wherein
    said winding phases, which are adapted to be controlled in phase opposition, are inductively coupled.

13. The motor according to claim 4, wherein
    said winding phases are inductively coupled with each other via a lamination stack forming part of the stator.

14. The motor according to claim 2, wherein
    said first power transistor (124) and said second power transistor (128) have a common emitter resistor (132).

15. The motor according to claim 2, wherein a respective Miller capacitor (152, 158) is associated with each power transistor (124, 128).

16. The motor according to claim 2, wherein the amplitude of a rotor position signal (OUT1, OUT2) increases, at least in a range, as operating voltage ($U_B$) of the motor (110) increases.

17. The motor according to claim 2, further comprising, for generation of the rotor position signals (OUT1, OUT2), a controller (146), whose operating voltage ($U_B$) is, above a predetermined value, held essentially constant, in order, upon overshooting of this predetermined value, to hold constant the amplitudes of the rotor position signals.

* * * * *

UNITED STATES PATENT AND TRADEMARK OFFICE
CERTIFICATE OF CORRECTION

PATENT NO. : 6,307,338 B1
DATED : October 23, 2001
INVENTOR(S) : Kuner et al.

It is certified that error appears in the above-identified patent and that said Letters Patent is hereby corrected as shown below:

Column 2,
Line 53, after "overvoltage" "," should be deleted.

Column 3,
Line 15, after "380" -- , -- should be inserted.
Line 32, "optionally" should be -- Optionally --.

Column 4,
Line 57, "as" should be deleted.

Column 5,
Line 27, "t," should be -- $t_1$ --.

Column 6,
Line 11, after "$t_3$" -- , -- should be inserted.
Line 16, after "$t_4$" -- , -- should be inserted.

Column 7,
Line 14, before "The" -- . -- should be inserted.
Line 15, "t11" should be -- $t_{11}$ --.
Line 23, "o" should be deleted.

Signed and Sealed this

Twenty-second Day of October, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,307,338 B1
DATED : October 23, 2001
INVENTOR(S) : Kuner et al.

It is certified that error appears in the above-identified patent and that said Letters Patent is hereby corrected as shown below:

<u>Title page,</u>
Item [75], Inventors, remove "Irmgard Moosmann, Konigsfeld
                                Michael Moosmann, Konigsfeld
                                Christian Moos mann, Konigsfeld" add
-- Helmut Moosmann (deceased), Konigsfeld --

Signed and Sealed this

Twenty-fifth Day of March, 2003

JAMES E. ROGAN
*Director of the United States Patent and Trademark Office*